United States Patent [19]

Ichieda

[11] Patent Number: 5,220,667
[45] Date of Patent: Jun. 15, 1993

[54] COMPUTER SYSTEM

[75] Inventor: Keisuke Ichieda, Nagasaki, Japan

[73] Assignee: Mitsubishi Denki Kabushiki Kaisha, Tokyo, Japan

[21] Appl. No.: 584,606

[22] Filed: Sep. 19, 1990

[30] Foreign Application Priority Data

Sep. 25, 1989 [JP] Japan .................. 1-248343

[51] Int. Cl.$^5$ .................. G06E 9/24; G06F 12/00
[52] U.S. Cl. .................. 395/700; 395/425; 364/DIG. 1; 364/280.2; 364/975.2
[58] Field of Search ............ 395/600, 425, 400, 700; 364/DIG. 1, 222.81, 280.2, 946.9, 957.1, 975.2

[56] References Cited

U.S. PATENT DOCUMENTS

| | | | |
|---|---|---|---|
| 4,470,127 | 9/1984 | Thompson | 364/900 |
| 4,654,783 | 3/1987 | Veres et al. | 395/700 |
| 4,663,707 | 5/1987 | Dawson | 395/700 |
| 4,718,008 | 1/1988 | Chang et al. | 364/300 |
| 4,833,594 | 5/1989 | Familetti et al. | 395/700 |
| 4,979,106 | 12/1990 | Schneider | 395/700 |
| 4,987,531 | 1/1991 | Nishikado et al. | 364/200 |
| 5,012,405 | 4/1991 | Nishikado et al. | 364/200 |
| 5,088,031 | 2/1992 | Takasaki et al. | 395/400 |
| 5,093,779 | 3/1992 | Sakurai | 395/600 |
| 5,093,915 | 3/1992 | Platteter et al. | 395/700 |

FOREIGN PATENT DOCUMENTS 60-54689 12/1985 Japan .
60-57093 12/1985 Japan .
62-13704 3/1987 Japan .

Primary Examiner—Alyssa H. Bowler
Attorney, Agent, or Firm—Burns, Doane, Swecker & Mathis

[57] ABSTRACT

A computer system according to this invention makes it possible to perform initial loading of files directly from an auxiliary memory according to a check code in a management table in a battery-backed-up memory. In direct file loading, the auxiliary memory is accessed as per physical addresses and sizes of each of the blocks constituting each file to be loaded. This direct reading of necessary files enables to reduce significantly the number of times the auxiliary memory is accessed for the purpose, thereby shortening the time required for initial loading of the files.

7 Claims, 4 Drawing Sheets

COMPUTER SYSTEM

BACKGROUND OF THE INVENTION

1. Field of the Invention

The present invention relates to a computer system which shortens the time required for initial loading of files.

2. Description of the Prior Art

FIG. 1 is a block diagram showing a prior art computer system. In FIG. 1, reference numeral 1 is a processor that controls the entire computer system; numeral 2 is a ROM (read only memory) which, for use by the processor 1, contains a program for initial program loading; numeral 3 is a RAM (random access memory) to which the processor 1 loads files needed to be processed; numeral 4 is a disk that acts as an auxiliary memory containing various files including those to be loaded to the RAM 3; and numeral 5 is a disk interface connected to the disk 4.

FIG. 2 is a view illustrating how various files are stored on the disk 4, and FIG. 3 is a view indicating how these files are arranged in hierarchical format. In these figures, reference numerals 10-12 are #1-#3 program files to be loaded to the RAM 3, and numerical 13 is a root directory and #1-#6 directory files defining the hierarchical structure of the program files 10-12.

In operation, applying power to the computer system allows the processor 1 to execute the program stored in the ROM 2. In this example, the program in the ROM 2 loads the #1 program file 10 through #3 program file 12 to the RAM 3.

The root directory 13 is read from the disk 4, the contents of the directory being analyzed to find the location where the #1 directory file 14 is stored. The #1 directory file 14 is read from the location thus acquired. In turn, the contents of the file 14 are analyzed to find the location where the #1 program file 10 to be loaded is stored. From the location thus obtained, the #1 program file 10 is read and loaded to the RAM 3 via the disk interface 5.

When the loading of the #1 program file 10 is completed, the root directory 13 is again read in order to load the #2 program file 11. In the same manner, subsequent files in the hierarchical structure are successively traced, from the #2 directory file 15 to #3 directory file 16 and so on, until the location where the #2 program file 11 is acquired. When read out, the #2 program file 11 is loaded to the RAM 3. In this case, because the #2 program file 11 is hierarchically lower than the #1 program file 10, the disk 4 needs to be accessed more often than in the case of the #1 program file in order to find the location where the #2 program file 11 is stored.

Since the #3 program file 12 is still lower in the file hierarchy, the four directory files, from the root directory 13 to #4-#6 directory files 17-19, are read out, their contents being analyzed to acquire the location where the #3 program file 12 is stored. From that location the #3 program file 12 is read and loaded to the RAM 3.

Because the prior art computer system is typically constructed as outlined above, one problem therewith is that the disk 4 needs to be accessed a very large number of times in order to load the object file to the RAM 3. The prolonged loading time means that the computer system must remain functionally idle for the duration of that time, i.e., between the time it is powered up and the time it is ready for use.

SUMMARY OF THE INVENTION

It is therefore an object of the present invention to provide a computer system that speeds up the initial loading of files.

In carrying out the above object, there is provided a computer system comprising a memory, an auxiliary memory and a processor, the memory being backed up by battery and containing a management table, the management table containing a physical address and a physical size, in the auxiliary memory, of each of blocks making up the file to be loaded, the table further containing a check code indicating whether each of the file's information is properly stored, the processor having a judging means which, upon loading a file, examines the corresponding check code in the table to see if the file is to be loaded according to the conventional file selection method or in a direct manner as per the physical addresses and sizes contained in the table.

Further objects and advantages will be apparent from the following description and the accompanying drawings.

DETAILED DESCRIPTION OF THE PREFERRED EMBODIMENTS

Figure 5:
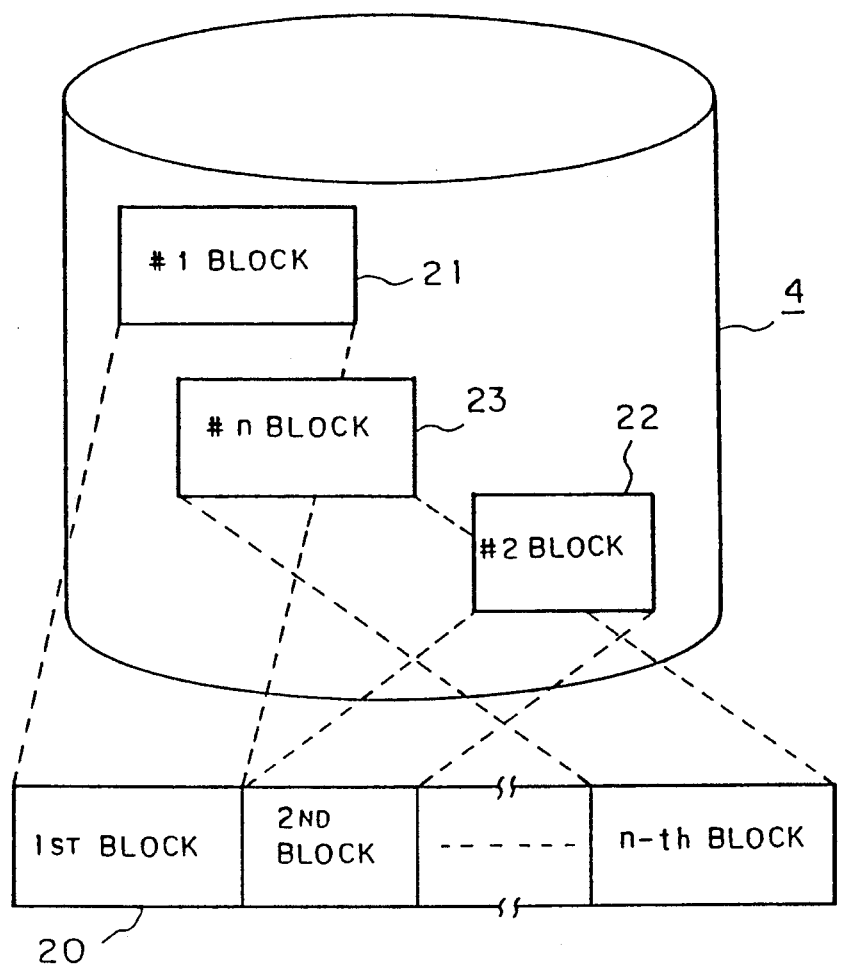
FIG. 5 is a schematic view showing how a file to be loaded is divided into blocks for storage on the disk 4 of the embodiment.
Figure 1:
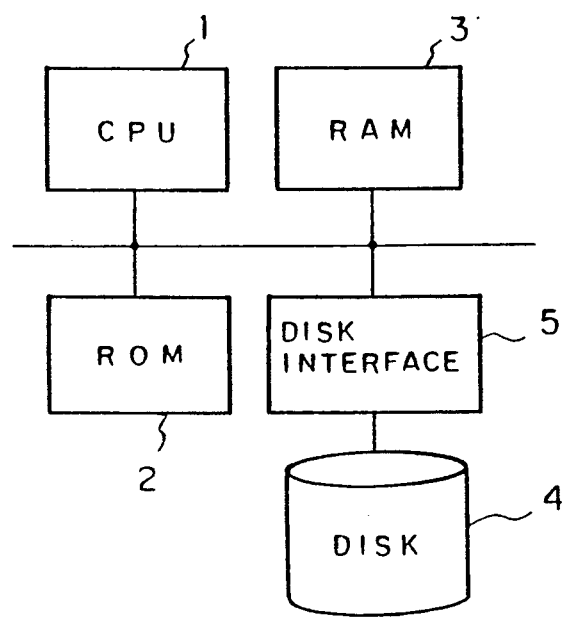
FIG. 1 is a block diagram of the representative prior art computer system.
Figure 2:
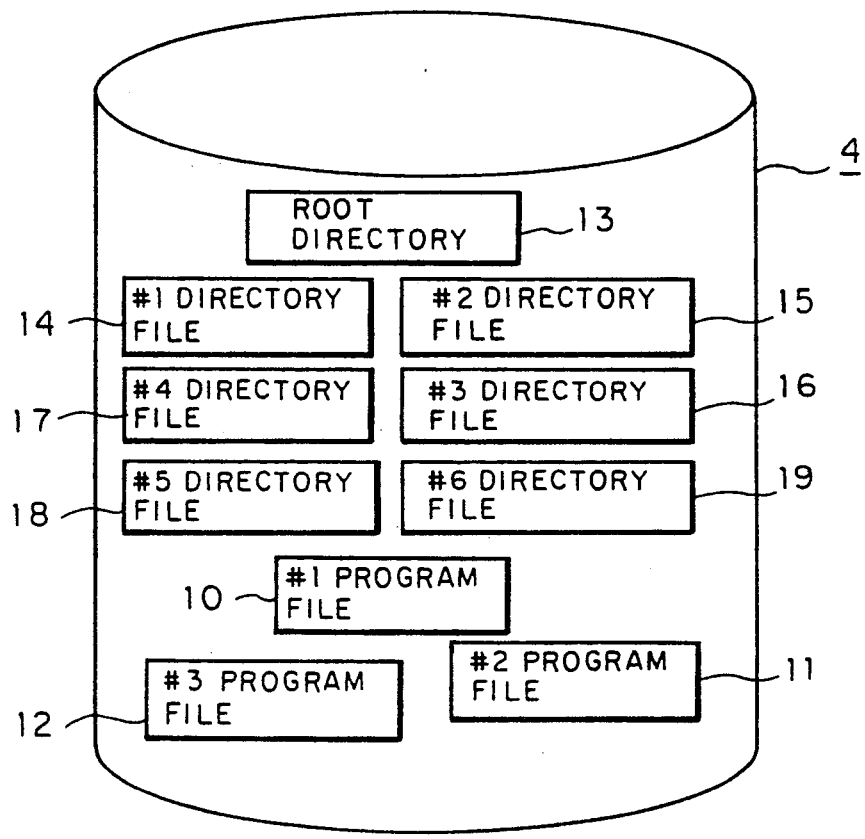
FIG. 2 is a schematic view showing how various files are stored on a disk in the prior art computer system.
Figure 3:
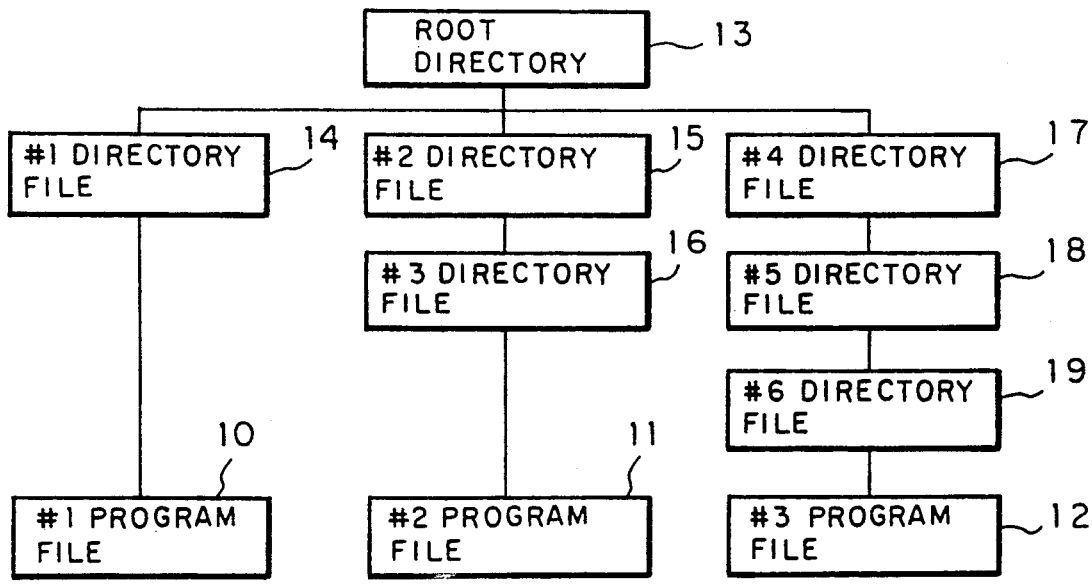
FIG. 3 is a view depicting how the files are arranged in a hierarchical structure in the prior art computer system.
Figure 4:
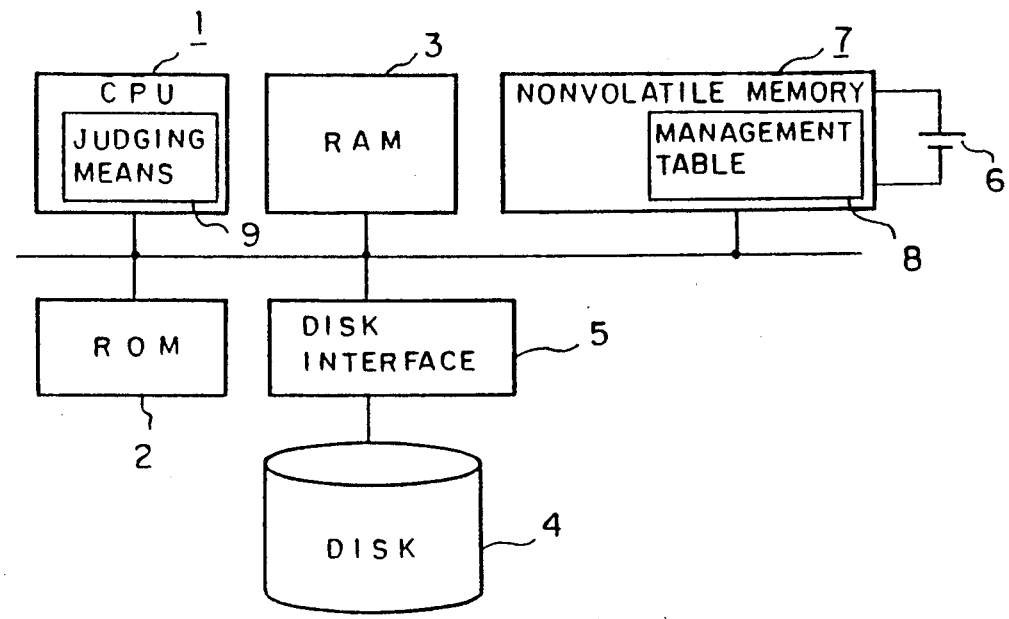
FIG. 4 is a block diagram of a preferred embodiment of the invention.

The preferred embodiment of the present invention will now be described by referring to the accompanying drawings. In FIG. 4, reference numeral 2 is a ROM; numeral 3 is a RAM; numeral 4 is a disk that acts as an auxiliary memory; and numeral 5 is a disk interface. In FIGS. 1 and 5, like reference characters designate like or corresponding parts, and any repetitive descriptions thereof are omitted.

Reference numeral 6 is a battery independent of the power source for the computer system; numeral 7 is a nonvolatile memory (RAM) which, backed up by the battery 6, retains its contents when the computer system is powered off; and numeral 8 is a management table which contains the physical address and size of each of the blocks making up each file to be loaded, as well as a check code indicating whether the file's information has its contents properly retained.

Reference numeral 9 is a judging means which, when the processor loads a file from the disk 4 into the RAM 3, examines the corresponding check code in the management table 8 to see if the file is to be loaded by the conventional file selection method or in a direct manner as per the appropriate physical addresses and sizes. The processor 1 differs from its counterpart in FIG. 1 in that the former possesses the judging means 9.

FIG. 5 schematically shows how a program file to be loaded is divided into blocks and stored on the disk 4. In this figure, reference numeral 20 is the program file to be loaded, and numerals 21-23 are #1 block, #2 block and #n block, respectively, of the program file 20 stored on the disk 4. The program file 20 is a sequential file which, logically a group of sequentially continuous data as illustrated, may or may not be stored continuously depending on the use status of the disk 4. That is, a sequential file is generally stored in free blocks on the disk 4, the blocks being usually separated from one another, each block generally comprising a plurality of contiguous sectors on the disk. In the example shown, the program file 20 is divided into "n" blocks for storage, i.e., #1 block 21 through #n block 23 to be suitably stored into free space of the disk 4.

If the contents of the program file 20 are altered or supplemented, the locations of the blocks 21-23 and the sizes thereof vary; if the contents of the file remain unchanged, the locations and the sizes, of its blocks also stay unchanged. Therefore, when any file other than the program file 20 is generated, altered or deleted in the system, the locations of the blocks constituting the program file 20 are secured on the disk 4 as long as the contents thereof remain unchanged.

Figure 6:
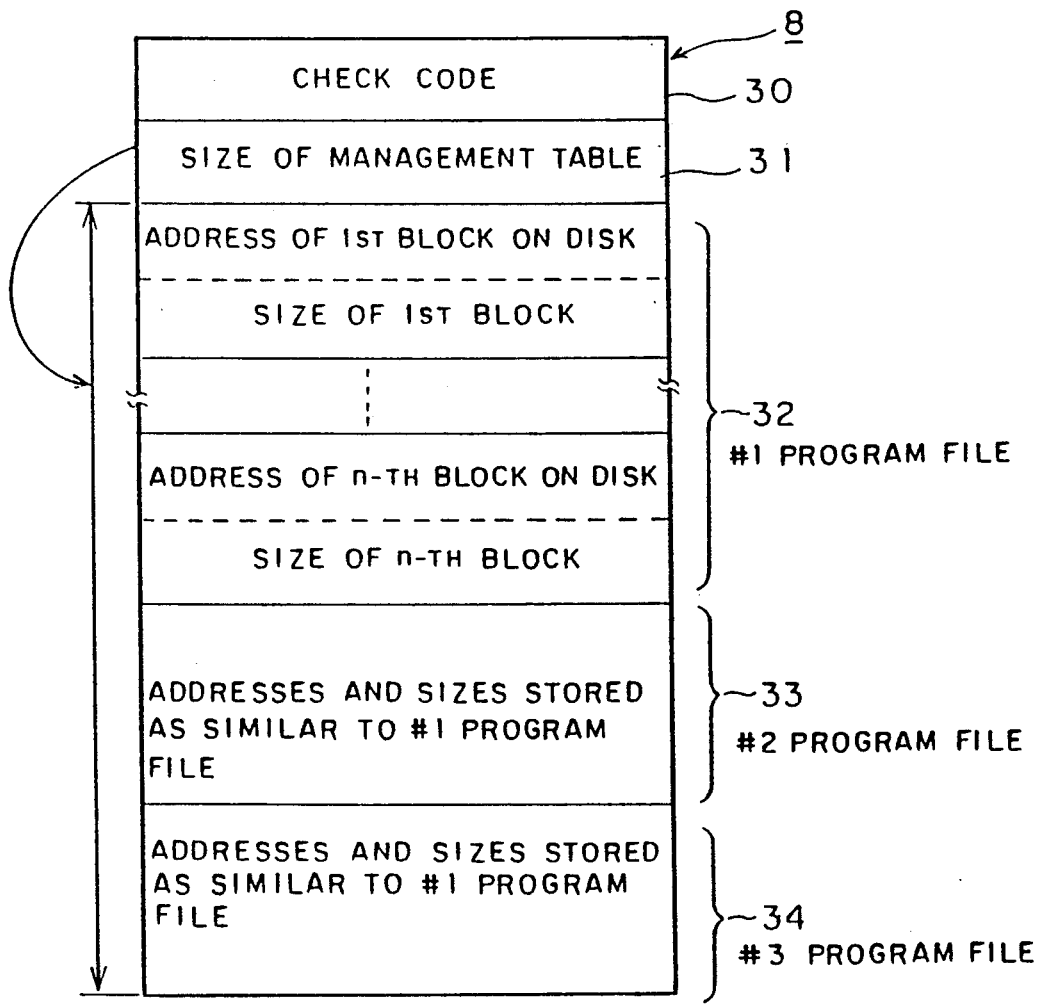
FIG. 6 is a view illustrating how a management table is allocated in the embodiment.

FIG. 6 depicts how the management table 8 mentioned above is structured. In FIG. 6, reference numeral 30 is a memory area that contains the check code indicating whether the contents of the management table 8 are properly retained. The check code may be a cyclic redundancy check (CRC) code. Reference numeral 31 is a memory area that contains the size of the management table 8. Numerals 32-34 are memory areas containing the physical addresses and sizes, on the disk 4, of the blocks constituting the #1 program file through #3 program file to be loaded.

Figure 7:
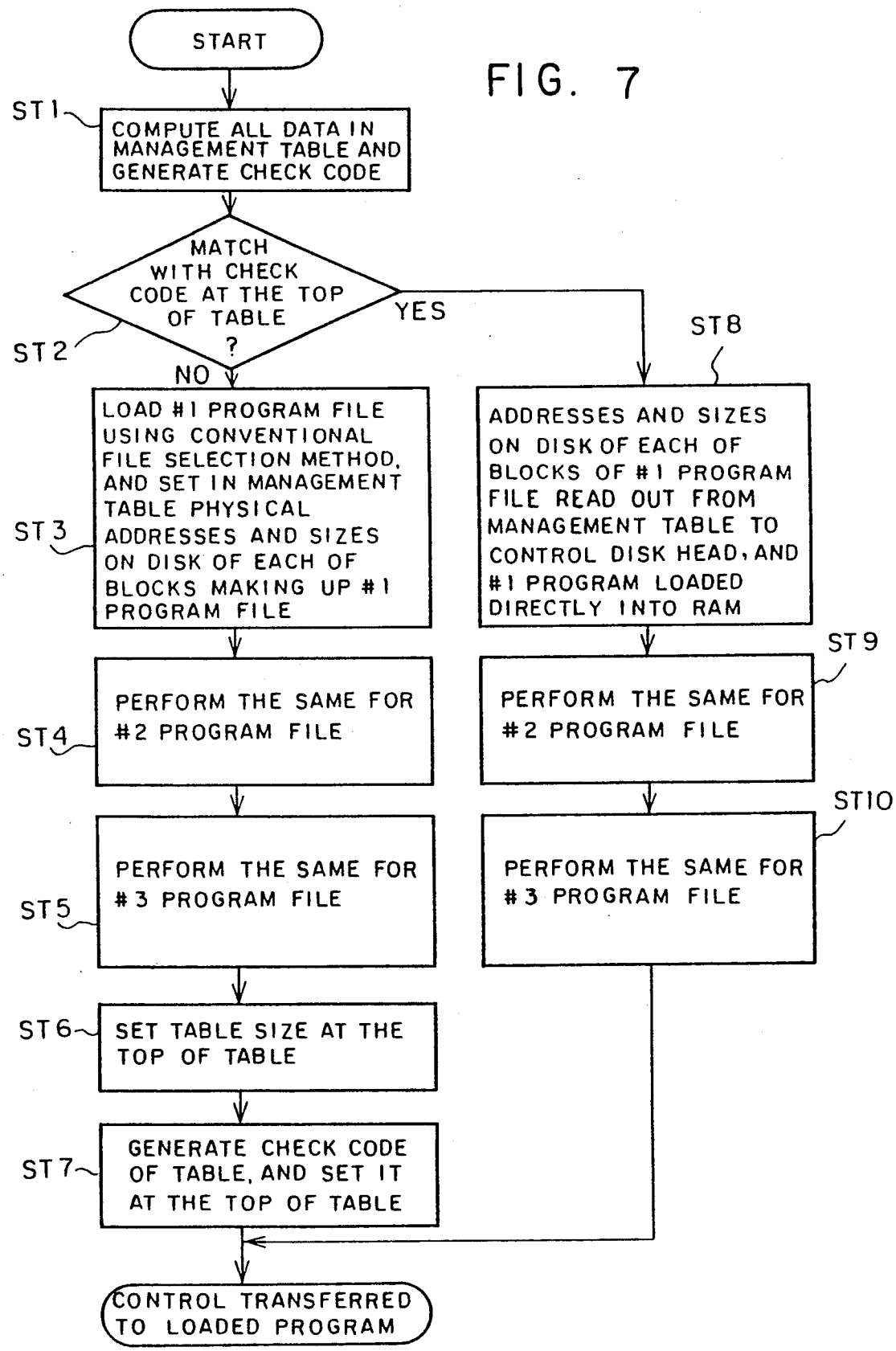
FIG. 7 is a flowchart showing steps of initial file loading executed by the processor in the embodiment.

FIG. 7 shows in flowchart format how the initial loading of program files is carried out. In operation, the computer system is powered up to start the initial loading of program files. In step ST1, the processor 1 generates a check code relative to the size data recorded in the memory area 31 of the management table 8. In step ST2, the processor compares the check code thus generated with another check code stored in the memory area 30 at the top of the management table 8.

At this point, the contents of the management table 8 are not correct for a first initial loading only. Thus the comparison in step ST2 results in a mismatch, causing the processor 1 to enter step ST3. In step ST3, the processor searches for the #1 program file using the conventional file selection method. That is, the search begins at the root directory and proceeds to other directly files therebelow in the hierarchy. The #1 program file is read and loaded to the RAM 3 via the disk interface 5. At the same time, the physical address and size of each of the blocks making up the #1 program file on the disk 4 are stored consecutively into the memory area 32 of the management table 8. In steps ST4 and ST5, the search, read and load operations are performed in the same manner on the #2-#3 program files. The program files that were read are loaded into the RAM 3, and the necessary entries are made into the management table 8.

When the loading of the program files is completed, the processor 1 goes to step ST6. In step ST6, the processor 1 totals the sizes in the memory areas 32-34, and stores the result into the memory area 31 as the management table size. In step ST7, a check code is generated according to the contents of the memory areas 32-34, and is set to the memory area 30 at the top of the management table 8. Thereafter, control is transferred to the loaded program so that the computer system may perform the processing for which the computer system is primarily responsible.

When the computer systems is reset or powered to restart, followed by another initial loading of program files, the processor 1 enters step ST1 as before. In step ST1, a check code is generated. In step ST2, a comparison is made between the generated check code and another check code stored in the memory area 30. In this case, the contents of the management table 8 are backed up properly and thus remain unchanged. Therefore the comparison results in a match, and the processor goes to step ST8.

In step ST8, the processor 1 reads from the memory area 32 of the management table 8 the physical address and size of each of the blocks making up the #1 program file on the disk 4. In accordance with the information thus retrieved, the head on the disk 4 is directly controlled to read consecutively the blocks constituting the #1 program file, the blocks being loaded into the RAM 3 via the disk interface 5. When the loading of the #1 program file is completed, the #2 program file and the #3 program file are loaded in steps ST9 and ST10, respectively, in the same manner as above.

When the direct loading of all program files is completed according to the management table 8, control is transferred to the loaded program. This allows the computer system to start the processing for which the computer system is primarily responsible.

If any of the files on the disk 4, subject to initial loading, is altered, deleted or otherwise changed in contents, at least the memory area 30 containing the check code is erased. This causes, upon the next pass of initial file loading, the processor 1 to go from step ST2 to step ST3. As described, the processor 1 in step ST3 loads the file using the conventional file selection method and updates the management table 8. If the files subject to initial loading undergo no change at all, the processor 1 always goes from step ST2 to step ST8. There the processor 1 directly loads the file using the management table 8.

As indicated, the computer system according to the present invention examines a check code in its management table to determine in what manner the corresponding file is to be loaded. For direct file loading, the disk is accessed for retrieval of the target file whose physical addresses and sizes are referred to in the management table in units of blocks, the addresses and sizes defining the location of the file on the disk. This eliminates the need for loading each necessary file after a lengthy sequential search starting from the root directory during initial program loading. Because the number of times the disk is accessed is drastically lowered, the time required for the initial loading of files is significantly reduced.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A computer system comprising:
   a main memory means to which a file is loaded when said system is powered on or reset;
   an auxiliary memory means for storing said file in units of blocks;
   a memory means, backed up by a battery, for storing a management table which contains physical addresses and sizes of each of said blocks of said file on said auxiliary memory means, and a check code for checking to see if the contents of said file's information are properly retained; and
   a judging means, based on said check code in said management table, for deciding whether said file is to be loaded from said auxiliary memory means to said main memory means in accordance with a conventional file selection method or in a direct manner as per said physical addresses and sizes found in said management table.

2. An apparatus as claimed in claim 1 wherein the main memory means comprises a random access memory.

3. An apparatus as claimed in claim 1 wherein the auxiliary memory means is selected for the group consisting of a magnetic disk device, an optical read/write device, and a magnetic tape device.

4. An apparatus as claimed in claim 1 wherein the memory means comprises a random access memory.

5. A method for initial loading of computer program files into a computer main memory which comprises the steps of:
   providing a computer system with at least a main memory, an auxiliary memory, a memory backed-up by battery power, and a judging means for comparing a check code with auxiliary memory contents;
   providing said auxiliary memory with said program files;
   creating a management table containing file location and file size data of all said files on said auxiliary memory, the size of said management table, and a check code;
   storing said management table in said memory backed-up by battery power;
   comparing said check code with auxiliary memory contents for establishing the accuracy of said management table;
   loading said program files either in accordance with conventional file selection method or in a direct manner as per said file location and said file size data found in said management table based on said comparison of said check code with said auxiliary memory contents.

6. A method as claimed in claim 5 wherein the steps of comparing said check code further comprises:
   initializing said computer system;
   computing file data of said auxiliary memory;
   reading said check code from said management table; and
   comparing said check code with said file data of said auxiliary memory for equivalency.

7. A method as claimed in claim 6 wherein the step of loading said program files further comprises:
   loading said program files from said file location and said file size data stored in said management table when said check code is equivalent to said file data;
   loading said program file in accordance with said conventional file selection method when said check code is not equivalent to said file data; and
   rewriting said management table when said check code is not equivalent to said file data.

* * * * *